United States Patent
Sinha

(10) Patent No.: US 8,336,034 B2
(45) Date of Patent: Dec. 18, 2012

(54) MODULAR BUG DETECTION WITH INERTIAL REFINEMENT

(75) Inventor: Nishant Sinha, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 462 days.

(21) Appl. No.: 12/721,329

(22) Filed: Mar. 10, 2010

(65) Prior Publication Data

US 2010/0281306 A1    Nov. 4, 2010

Related U.S. Application Data

(60) Provisional application No. 61/174,134, filed on Apr. 30, 2009.

(51) Int. Cl.
  *G06F 9/44* (2006.01)
  *G06F 11/00* (2006.01)
(52) U.S. Cl. .................. 717/131; 717/124; 714/38.1
(58) Field of Classification Search .......... 717/124–135; 714/37, 38.1
See application file for complete search history.

(56) References Cited

U.S. PATENT DOCUMENTS

| | | | |
|---|---|---|---|
| 2005/0204345 A1* | 9/2005 | Rivera et al. | 717/127 |
| 2007/0240141 A1* | 10/2007 | Qin et al. | 717/158 |
| 2009/0193401 A1* | 7/2009 | Balakrishnan et al. | 717/144 |
| 2010/0251221 A1* | 9/2010 | Nori et al. | 717/131 |

OTHER PUBLICATIONS

Ivančić et al., "F-Soft: Software Verification Platform," 2005, Springer-Verlag, p. 301-306.*
Sinha, Nishant, "Symbolic Program Analysis using Term Rewriting and Generalization," 2008, IEEE, p. 1-9.*
Saswat Anand, et al., Demand-Driven Compositional Symbolic Execution, C.R. Ramakrishnan and J. Rehof (Eds.): TACAS 2008, LNCS 4963, pp. 367-381, 2008.
Domagoj Babic, et al., Calysto: Scalable and Precise Extended Static Checking, *ICSE '08*, May 10-18, 2008, Leipzig, Germany 2008 ACM 978-1-60558-079-1/08/05.
Domagoj Babic, et al. Structural Abstraction of Software Verification Conditions, W. Damm and H. Hermanns (Eds.): CAV 2007, LNCS 4590, pp. 366-378, 2007.
Mana Taghdiri, et al. Inferring specifications to detect errors in code. Auto Software Eng, 14:87-121, Dec. 28, 2006.

* cited by examiner

*Primary Examiner* — Wei Zhen
*Assistant Examiner* — Qing Chen
(74) *Attorney, Agent, or Firm* — Bao Tran; Joseph Kolodka

(57) ABSTRACT

Systems and methods are disclosed to detect an error in a software with a computer readable code by applying a modular analysis based on the principle of structural abstraction and refinement of program structure; and detecting an assertion violation indicative of a software bug.

16 Claims, 4 Drawing Sheets

SAR (Program $P$)
$\mathcal{R}$ := Partition $P$ into regions    202
foreach region $R \in \mathcal{R}$ do
  $(\psi_R, \sigma_R, \phi_R)$ := LOCSUMMARIZE($R$)    204
$\phi$ := HOIST($\phi_R$)    206
foreach $\phi \in \Phi$ do    208
  $res$ := REF($\phi$)
  /* Report witness if $res$ is SAT */

REF($\phi$)
while $\phi$ contains *placeholders* do
  if CHECK($\phi$) = UNSAT then
    return UNSAT
  Pick a placeholder $\lambda$ in $\phi$
  $t$ := GETSUMMARY($\lambda$)
  $\phi$ := $\phi[\lambda \leftarrow t]$
return SAT

FIG. 2

REF-IR(ctx, φ)

BEGIN: ASSERT (ctx, φ)
  if ctx is satisfiable then
    | goto BLOCK
  else
    | goto EXPAND BLOCK: $V_\Pi$ := set of π-variables in φ
  /* Assert π-constraints */
  $\phi_\pi := \bigwedge\{(v = false) \mid v \in V_\Pi\}$
  ASSERT(ctx, $\phi_\pi$)
  if ctx is satisfiable then
    | return SAT
  else
    | goto EXPAND EXPAND: $\phi_\pi$ := MCS(ctx)
  if $\phi_\pi$ = false then
    | return UNSAT
  /* Witness may exist */
  RETRACT (ctx, $\phi_\pi$)
  /* Select placeholders to refine */
  $V_\pi$ := Variables in $\phi_\pi$
  $V'_\pi := V_\pi \cup Dep(V_\pi)$
  foreach $\lambda \in V'_\pi$ do
    | t = GETSUMMARY (λ)
    | φ := φ[λ → t]
  goto BEGIN

MODULAR BUG DETECTION WITH INERTIAL REFINEMENT

This application claims priority to U.S. Provisional Application Ser. No. 61/174,134 filed Apr. 30, 2009, the content of which is incorporated by reference.

BACKGROUND

Modular program analyzers that exploit the program structure are more scalable since they avoid repeated analysis of program regions by computing reusable summaries. Traditional modular methods target proofs of program assertions by computing and composing summaries in an intertwined manner. For example, to compute a summary for a function F, the methods need to compute and compose the summaries of all the callees of F, even if many of these callees are irrelevant to checking the property at hand. Recent methods based on structural abstraction/refinement (SAR) alleviate this problem by dissociating summary composition from computation: function summaries and verification conditions are first computed locally by skipping the analysis of callees (abstraction phase) and then composed lazily with callee summaries (refinement phase). Refinement is property-driven and employs an efficient constraint solver for the program logic. In contrast to other abstraction/refinement methods, e.g., predicate abstraction, computing a structural abstraction is relatively inexpensive, and refinement is done incrementally via pre-computed function summaries.

SAR holds promise for scalable bug detection in software since the abstraction is inexpensive to compute and refinement employs pre-computed procedure summaries. The refinement step is key to the scalability of an SAR technique: efficient refinement should avoid exploring program regions irrelevant to the property being checked. Current refinement techniques, guided by the counterexamples obtained from constraint solvers, have little or no control over the program regions explored during refinement.

By dissociating summary computation from composition, SAR has the ability to select which regions to explore during the refinement (composition) phase for checking properties efficiently. The selective refinement strategy determines the efficiency of a SAR-based verification method. Ideally, we desire an optimal strategy, which explores (composes with) exactly those program regions which are relevant to a given property. Optimal refinement is as hard as the (undecidable) program verification problem since it may require a knowledge of the complete program behavior for making a selection. Consequently, researchers employ heuristics for performing refinement, guided by the counterexamples obtained when the solver checks the abstract model. However, the solver, being oblivious of the program structure, may produce spurious counterexamples that continuously drive the refinement towards exploring newer program regions, even though a witness may exist undetected in a subset of the currently explored regions. Redundant refinement of this form burdens the solver with irrelevant summary constraints, leading to dramatic increase in solving times, and, in many cases, to the failure of an SAR-based method.

SUMMARY

In one aspect, systems and methods are disclosed to detect an error in a software with a computer readable code by applying a modular analysis based on the principle of structural abstraction and refinement of program structure; and detecting an assertion violation indicative of a software bug.

Implementations of the above aspect may include one or more of the following. The system can expand arbitrary program regions during refinement, based on the hierarchical program structure. Inertial refinement of program regions can be done, which avoids exploring new regions until necessary. The system employs minimal correcting sets produced by constraint solver to select program regions to explore. The system can expand only relevant placeholders and reducing the number of placeholders expanded. The system includes blocking and unblocking paths to program regions using path summary variable for the region. Loops can be dynamically expanded during analysis. Recursive functions can be expanded dynamically during analysis. The system can determine a local function summary using side-effects analysis of called functions.

In another aspect, a method to detect an error in a software with a computer readable code includes generating a local summary map and one or more error conditions (ECs) for one or more functions in the computer readable code; checking the EC for each function for each by forward composition of summaries using a work list and structural refinement; selecting a predetermined function and a global context from the work list; performing path blocking based refinement; adding to the work list the predetermined function and global context for all functions called from the predetermined function using a context-sensitive forward composition code to create a global context; and checking an error condition in the predetermined function using path blocking based structural refinement.

In another aspect, system to detect software bugs uses inertial refinement (IR) by resisting the exploration of new program regions during refinement. New program regions are incrementally analyzed only when no error witness is realizable in the current regions. The IR procedure is implemented as part of a generalized SAR method in the F-Soft verification framework for C programs. Experimental comparison with a previous state-of-the-art refinement method shows that IR explores fewer program regions to detect bugs, while maintaining competitive run-times.

Advantages of the preferred embodiments may include one or more of the following. The method explores fewer regions while maintaining competitive run-times. The system uses a generalized SAR scheme that may abstract (and later refine on-demand) arbitrary program regions, including loops. As a result, the method can exploit the entire modular program structure to check properties efficiently. A consequence of this generalization is that the system does not statically unroll loops and recursive functions for checking properties; they are dynamically unrolled in a property-driven manner by inertial refinement. The modular bug detection method uses the generalized structural abstraction/refinement (SAR) approach, which fully exploits the modular structure of a program (functions, loops and conditionals) to perform an efficient analysis. The system uses inertial refinement, which avoids exploring new program regions until necessary. The technique is property-guided and employs minimal correcting sets produced by constraint solvers to efficiently select new regions to explore. The refinement avoids the potentially expensive analysis of the concrete model: placeholders are selected by analyzing the abstract VC using a don't-care analysis of the abstract counterexample. The inertial refinement method is aware of the program structure and avoids exploring new regions until no witness exists in the current regions. Further, the generalized SAR methodology operates on arbitrary program regions and dynamically unrolls loops and recursive functions by inertial refinement for checking properties. The system determines precise summaries effectively using a merge-based data flow analysis, and employ SAR to explore all program paths relevant to the property in an incremental fashion.

BRIEF DESCRIPTION OF THE DRAWINGS

FIG. 2 shows an exemplary process for checking assertions in a program using a generalized structural abstraction.

FIG. 4 shows a pseudo-code of the inertial refinement process Ref-IR using an SMT solver.

DESCRIPTION

A system to detect software bugs is disclosed that uses inertial refinement (IR) which resists the exploration of new program regions during refinement. New program regions are incrementally analyzed only when no error witness is realizable in the current regions. The IR procedure is implemented as part of a generalized SAR method in the F-Soft verification framework for C programs. Experimental comparison with a previous state-of-the-art refinement method shows that IR explores fewer program regions to detect bugs, while maintaining competitive run-times.

Figure 1A:
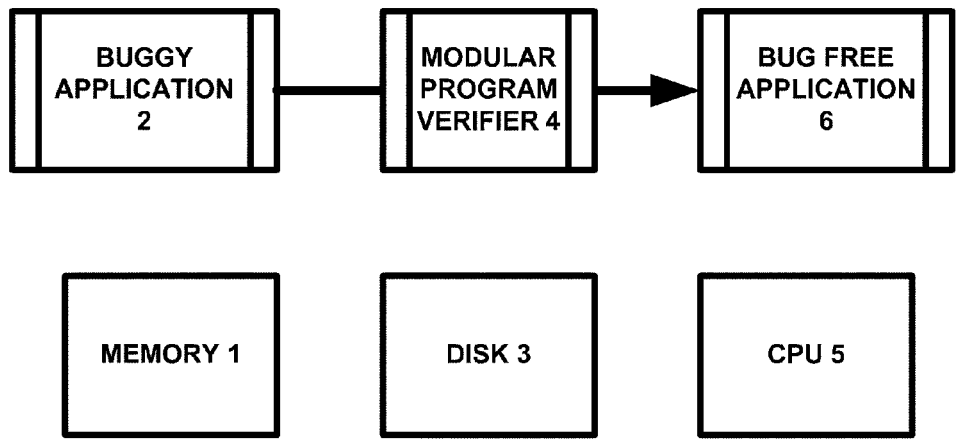
FIG. 1A shows an exemplary system to execute bug-free software.

FIG. 1A shows an exemplary system to execute bug-free software. In this system, a computer including memory 1, disk 3 and processor 5 executes one or more application software. A potentially buggy application software 2 is received by the system and processed by a modular program verifier 4. After verification, the bug free application software 6 is executed by the CPU 5.

Figure 1B:
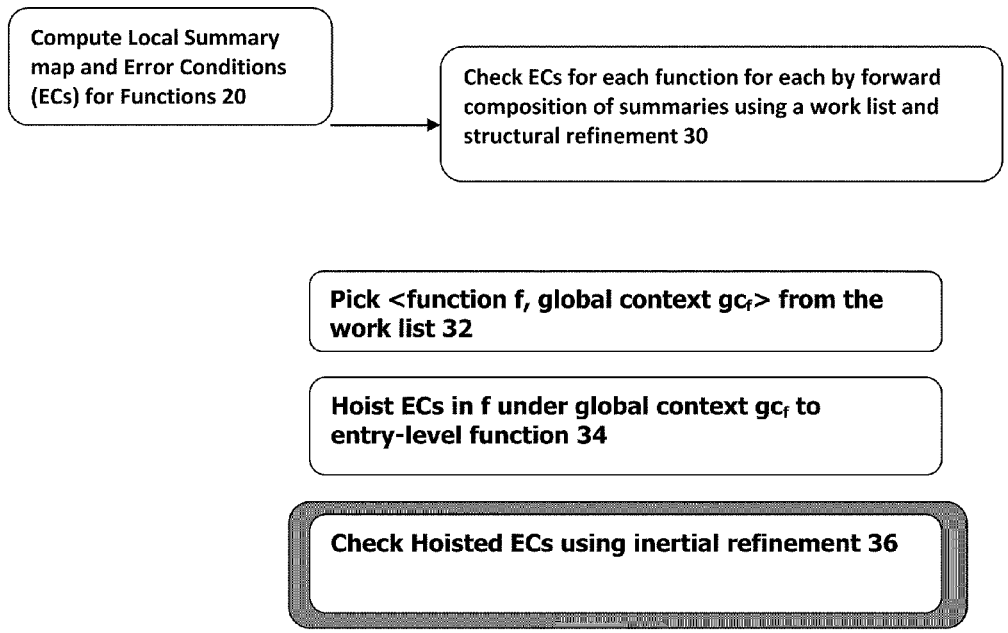
FIG. 1B shows an exemplary operation of a verifier in FIG. 1A.

Turning now to FIG. 1B, an exemplary operation of the verifier 4 is shown. First, the verifier 4 computes a Local Summary map and one or more Error Conditions (ECs) for Functions in 20. Next, the verifier 4 checks the ECs for each function for each by forward composition of summaries using a work list and structural refinement in 30. In operation 30, the system selects a function f and a global context $gc_f$ from the work list in 32, adds to the work list a function g and global context $gc_g$ for all functions g called from f, using a context-sensitive forward composition algorithm for creating global contexts in 34. The verifier then checks for Error Conditions in f under $gc_f$ using path blocking based structural refinement in 36.

The verifier 4 uses a generalized SAR scheme that may abstract (and later refine on-demand) arbitrary program regions, including loops. As a result, the method can exploit the entire modular program structure to check properties efficiently. A consequence of this generalization is that the system does not statically unroll loops and recursive functions for checking properties; they are dynamically unrolled in a property-driven manner by inertial refinement. The modular bug detection method uses the generalized structural abstraction/refinement (SAR) approach, which fully exploits the modular structure of a program (functions, loops and conditionals) to perform an efficient analysis. The system uses inertial refinement, which avoids exploring new program regions until necessary. The technique is property-guided and employs minimal correcting sets produced by constraint solvers to efficiently select new regions to explore.

In one embodiment, the verifier 4 uses under-approximate data flow analysis technique based on program expressions to detect bugs. The method first computes approximate function summaries using structural abstraction and then checks error conditions using structural refinement. The method then checks error conditions by performing forward composition of summaries using a work list. The system performs structural refinement using path blocking: the system tries to avoid expanding function calls that do not affect the feasibility of the error conditions, using an incremental SMT solver. This reduces the number of expansion iterations and improves the efficiency of structural refinement.

The IR method resists exploring new program regions during refinement, as much as possible, in hope of finding a witness within the currently explored regions. Given a program assertion A, the method computes an initial abstract error condition $\phi$ for violating A, by exploring program paths in a small set of regions relevant to A, while abstracting the other adjacent regions. To check if $\phi$ is feasible, IR first symbolically blocks all unexplored program regions involved in $\phi$, by adding auxiliary constraints to the solver. This forces the solver to find witnesses to $\phi$ that avoid the unexplored regions. If such a witness is found, IR is able to find a true witness by avoiding the costly analysis of the unexplored regions. Otherwise, IR explores a minimal set of new program regions that may admit an error witness. The minimal set of regions are computed in a property-driven manner by analyzing the proofs of infeasibility inside the solver (based on the notion of minimal correcting sets), which provide hints as to why the currently explored regions are inadequate for checking the property. IR has multiple advantages as a refinement method. IR improves the scalability of SAR-based methods by restricting search to a small set of program regions, leading to more local witnesses than other methods. Moreover, IR exploits the fact that, most bugs can be detected by analyzing a small number of program regions.

The program region R corresponds to a structural unit of the program syntax, i.e., a function body, a loop or a conditional statement. To formalize regions precisely, a sequential C program P is modeled as a hierarchical recursive state machine (RSM) M. The RSM M consists of a set of regions: each region contains a control flow graph, which in turn consists of (i) a set of nodes (labeled by assignments), (ii) a set of boxes (each box is, in turn, mapped to a region), and (iii) control flow edges among nodes and boxes (labeled with guards). Each region also has special entry and exit nodes. An unfolding of M is obtained by recursively inlining each box by the corresponding region. An edge from a node to a box is said to be a call edge. A program region $R_1$ is said to precede another region $R_2$, if $R_1$ contains a box that maps to $R_2$, i.e., control flow enters $R_2$ on leaving $R_1$ and thus $R_2$ succeeds $R_1$ in this case. Assertions for property checking, e.g., dereference safety, array bound violations, etc., are modeled as special error nodes in the RSM M; the reachability of error nodes implies that the corresponding assertion is violated.

For each program region R, the side-effects set M(R) denotes the set of program variables that may be modified on executing R (together with its successors) under all possible program contexts, and are referenced elsewhere in the program. The inputs to region R consist of the set of variables that are referenced in R. To compute side-effects for programs with pointers, the heap size is assumed to be bounded (to handle dynamic allocation and recursive data structures) and employ a whole-program side-effect analysis to compute the side-effects.

Given an error node eb in the program RSM and a set of paths T terminating at eb, the formula representing the feasibility condition for the set T is said to be an error condition (EC). In contrast to verification conditions (VCs), which express sufficient conditions for existence of proofs, the satisfiability of ECs implies existence of assertion violations. An EC φ has a witness, if it has a satisfying solution; otherwise, the EC has a proof. An infinite number of ECs may be derived from a location eb (due to loops and recursion). The under-approximate analysis checks only a finite subset of all the ECs and therefore, guarantees only the soundness of bugs detected; but there is no implication that eb is unreachable.

Analyzing all program regions may neither be feasible for a given program analysis nor necessary for checking a given property. Structural abstraction enables a property-driven modular analysis of programs while avoiding the analysis of undesired regions, e.g., one or more nested successor regions of a region Q can be abstracted during analysis of Q. The structural abstraction of a region R is a tuple $(\pi_R, \sigma_R)$, where (i) $\pi_R$ is a Skolem constant (basically, a fresh variable) summarizing the paths in R and (ii) $\sigma_R$ is a map with entries of form $(v \mapsto \lambda_{v,R})$ where $v \in M(R)$ is a side-effect of R and $\lambda_{v,R}$ is a Skolem constant which models arbitrary modifications of v in R. In the following, the Skolem constants $\pi_R$ and $\lambda_{v,R}$ are jointly referred to as placeholder variables. We also refer to placeholders of form $\pi_R$ as π-variables. The set of placeholders in the range of $\sigma_R$ are said to depend on $\pi_R$, and are denoted by $Dep(\pi_R)$. For example, the call to bar in the function foo in FIG. 1 (cf. Sec. 3) is abstracted by the tuple $(\pi_b, [ret_{bar} \mapsto \lambda_{b,ret}])$, where $\lambda_{b,ret} \in Dep(\pi_b)$.

When the analysis encounters a call to R in a preceding region Q, it conjuncts the placeholder $\pi_R$ with the current path condition ψ, updates the current value map σ with $\sigma_R$, and continues analyzing Q. If R is later found relevant to an assertion in Q, the initial abstraction of R is refined on-demand. The abstraction has several advantages: first, it is cheap (computation of side-effects M(R) is done once for the whole program); second, it allows on-the-fly refinement using a summary of R, which is computed only once, and finally, it allows us to analyze program fragments in absence of the whole program. Note that the formalization generalizes the earlier approaches to handle all modular units of program, such as, functions, loops, conditionals, etc., in a uniform manner.

FIG. 2 shows an exemplary process for checking assertions in a program using a generalized structural abstraction. The process partitions the program into a set of regions in 202. Next, for each region, the following is done: determine a local summary while abstracting successor regions in 204. The local summary includes a predicate summarizing the paths in the region, a map summarizing the outputs or side effects of the region when symbolic expressions are applied to inputs of the region, and a set of error conditions (ECs) corresponding to assertion violations in the region. Next, the ECs are hoisted to the entry function of the program in 206. The hoist process determines the weakest preconditions of ECs with respect to a bounded set of calling contexts to the region. Finally, a REF operation checks each hoisted EC using structural refinement based on a constraint solver in 208. The constraint solver can be an SMT solver. The REF operation iteratively chooses a placeholder, expands the placeholder using its summary expression, and checking if the ECs are satisfiable. The REF operation terminates if the EC is unsatisfiable (SAT) or if the function does not contain placeholders and is satisfiable (SAT).

Pseudo code for the process of FIG. 2 to check assertions in a program P, is as follows:
  partitions the program into a set of regions R.
  For each region R ∈ R, a procedure LocSummarize is used
    to compute a local summary (by a forward data flow analysis over program expressions or using weakest preconditions) while abstracting all the successor regions of R as above. The local summary $(\psi_R, \sigma_R, \Phi_R)$ consists of the predicate $\psi_R$ summarizing the paths in R, the map $\sigma_R$ summarizing the outputs (side-effects) of R in terms of symbolic expressions over inputs to R, and a set of error conditions (ECs) $\Phi_R$ which correspond to assertion violations in R.
  The ECs $\Phi_R$ are local to R; in order to find violating executions starting from the program entry function, these ECs are hoisted to the entry function of the program by the Hoist procedure, which computes weakest preconditions of ECs with respect to a bounded set of calling contexts to the region R. Note that Hoist may also use structural abstraction during backward propagation.
  procedure Ref is used to check each hoisted EC φ using structural refinement based on a constraint solver, e.g., an SMT solver. Ref proceeds iteratively by choosing a placeholder λ in φ, expanding λ using its summary expression t (computed by the GetSummary procedure), and checking if the resulting φ is satisfiable. The procedure Ref terminates when the solver finds the EC φ unsatisfiable (UNSAT) or if φ does not contain any placeholders and is satisfiable (SAT).

Examplary operation of the operation of inertial refinement is discussed next for checking the function foo. In the following program fragment, complex function bar is not described.

TABLE 1

| 1 | int x,y; | 1 | int neg (int a) { |
|---|---|---|---|
| 2 | void foo (int sp, int c) { | 2 | if (a > 0) return −a; |
| 3 | if (p == NULL) | 3 | else return a; |
| 4 | x = c; | 4 | } |
| 5 | else x = bar (sp); | | |
| 6 | ... | 1 | void loopf (int n) { |
| 7 | assert (x > c); | 2 | int i=0, j=0; |
| 8 | ... | 3 | while (i < n) { |
| 9 | if (x == c) | 4 | j = j + 2 * 1; |
| 10 | y = neg(x); | 5 | i++; |
| 11 | else y = 0; | 6 | } |
| 12 | assert (y >= 0); | 7 | assert (n >= 0 && j < 2 * n); |
| 13 | } | 8 | } |

In the above: foo contains a call to a complex function bar (line 5) and two assertions at lines 7 and 12, respectively. The method first summarizes foo locally using a precise data-flow analysis with program expressions: a form of forward symbolic execution with data facts being merged path-sensitively at join nodes. The analysis propagates data of form (ψ,σ) through foo: ψ is the path condition at the current program location (summarizing the set of incoming paths to the location symbolically) and σ is a map from program variables to their path-sensitive (symbolic) values at the current location. On encountering the call to bar, the method first abstracts bar with a tuple $(\pi_b, [ret_{bar} \mapsto \lambda_{b,ret}])$, where the placeholder $\pi_b$ abstracts the set of paths through bar symbolically, and the placeholder $\lambda_{b,ret}$ abstracts the return value of bar. The placeholder $\pi_b$ plays a crucial role in the analysis, which uses $\pi_b$ tactfully to avoid exploring paths leading to bar. Using the above abstraction, the value of x at line 6 (computed by merging values from the branches of the conditional at line 3) is $x_1 = ite(p \neq 0 \wedge \pi_b, \lambda_{b,ret}, c)$ and the path condition is $\psi' = ((p \neq 0 \wedge \pi_b) \vee (p=0))$. Finally, the violating condition for assertion at line 7 (the path condition conjuncted with the negated assertion) is $\phi = \psi' \wedge (x_1 \leq c)$.

φ depends on the two placeholders $\pi_b$ and $\lambda_{b,ret}$ for bar, which are unconstrained. Checking φ with a constraint solver may return a witness (lines 2-5-6-7) involving a call to the complex function bar. However, this witness may be spurious if bar always returns a value greater than c. To check if the witness is an actual one, refinement may expand $\pi_b$ and $\lambda_{b,ret}$ with the corresponding precise summaries from bar. Line 4 sets x to c, and hence a true witness can be determined for $\phi$ (line 2-3-4-6-7) without analyzing bar. However, this is not apparent from $\phi$ syntactically, and therefore, a naive SAR checker will perform spurious refinement by expanding both the placeholders. Other refinement procedures may also perform spurious refinement in this case.

In contrast, the inertial refinement (IR) procedure resists expansion and checks if a proof/witness to $\phi$ exists within the currently explored region. To this goal, the analysis blocks paths leading to the unexplored function bar by adding a constraint $\neg \pi_b$ to $\phi$ and then checks for a solution. If a solution is found, as in this case, the method is able to avoiding the cost of a spurious refinement. Otherwise, IR selects a minimal new set of regions to explore, which may admit an error witness.

Most bug finding approaches statically unroll the loops to a fixed depth, which may lead to several errors being missed. Although loops may be also handled as tail-recursive functions in SAR (as in), conventional static analysis seldom does so. A structural abstraction specific to loops can be used so that inertial refinement corresponds to dynamically unrolling loop iterations in a property-driven manner. As a result, the method can check non-trivial assertions, e.g., the assertion at line 7 in the loopf function in Table 1 is violated only when $n \geq 3$.

For example, the program fragment in Table 1 consists of the following top-level regions: function bodies foo, neg and loopf. Region foo contains two boxes mapped to if-then-else (conditional) regions $C_1$ (lines 3-5) and $C_2$ (lines 9-11); both regions succeed region foo. $C_1$ and $C_2$, in turn, contain boxes mapped to bar and neg function regions, respectively. Similarly, the loopf function region contains a box corresponding to the loop body region (lines 3-6). For ease of description, an inlined instance of a region in a box is considered to be a region also. In the following, standard modular program analysis terminology is used, which can be extended to RSM regions in a straightforward manner.

In the program fragment shown in Table 1, the analysis first partitions the fragment into various regions: foo, neg, loopf functions, and the loop body region (lines 3-6 in loopf). Then, LocSummarize summarizes each region in form of $\psi_R, \sigma_R$ (path and side-effect summaries) and ECs $\Phi_R$. For summarizing foo, the two calls to bar and neg are initially abstracted by placeholders $\pi_b$, $\lambda_{b,ret}$ and $\pi_n$, $\lambda_{n,ret}$, respectively. The summary for foo consists of $\psi_{foo} = \psi_1 \wedge \psi_2$, where $\psi_1 = (p=0 \vee (p \neq 0 \wedge \pi_b))$, $\psi_2 = ((x_1 = c \wedge \pi_n) \vee (x_1 \neq c))$, and $\sigma_{foo} = [x \mapsto x_1, y \mapsto y_1]$, where $x_1 = \text{ite}(p \neq 0 \wedge \pi_b, \lambda_{b,ret}, C)$ and $y_1 = \text{ite}(x_1 = c \wedge \pi_n, \lambda_{n,ret}, 0)$. Also, $\Phi_{foo}$ contains two ECs ($\psi_1 \wedge x_1 \leq c$) and ($\psi_{foo} \wedge y_1 < 0$). All the ECs are then hoisted to the entry functions (foo and loopf here): in this case, the ECs for foo are already hoisted. Finally, REF analyzes each EC $\phi$ in the entry function by iteratively checking $\phi$ and expanding placeholders.

SAR can determine an EC $\phi$ for an error location l after hoisting and if the Ref($\phi$) returns SAT, then there exists a true error witness to l. In general, many placeholders in an EC $\phi$ are not relevant for finding a proof or a witness, and expanding them leads to wasteful refinement iterations along with an increased load on the solver. Selective refinement, therefore, focuses on selecting a set of placeholders in $\phi$ that are relevant to the property. This allows Ref to finish early if there exist no selected placeholders in the current EC $\phi$. An additional benefit of selective refinement is that, in many cases, recursive programs can be handled without expanding all the placeholders.

Preferably, the process of FIG. 2 uses selective refinement called inertial refinement. Inertial refinement (IR) avoids exploring irrelevant regions during modular analysis since most violations involve only a small set of program regions. To this goal, IR determines a witness/proof for an EC inside the program regions explored currently, say R. If IR is unsuccessful, then R is inadequate for computing a witness or a proof. Therefore, IR augments R by a minimal set of successor program regions, which may admit a witness. The new regions are selected efficiently based on an analysis of why the current region set R is inadequate. In order to describe the details of IR, the notion of region blocking is discussed next. A region blocking constraint ($\pi$-constraint, in short) for a $\pi$-variable $\pi_R$ is defined to be $\phi_\pi = \neg \pi_R$. Asserting $\phi_\pi$ when checking an EC $\phi$ in the region Q, forces the solver to find witnesses by blocking the program execution paths that lead from Q to R.

Figure 3:
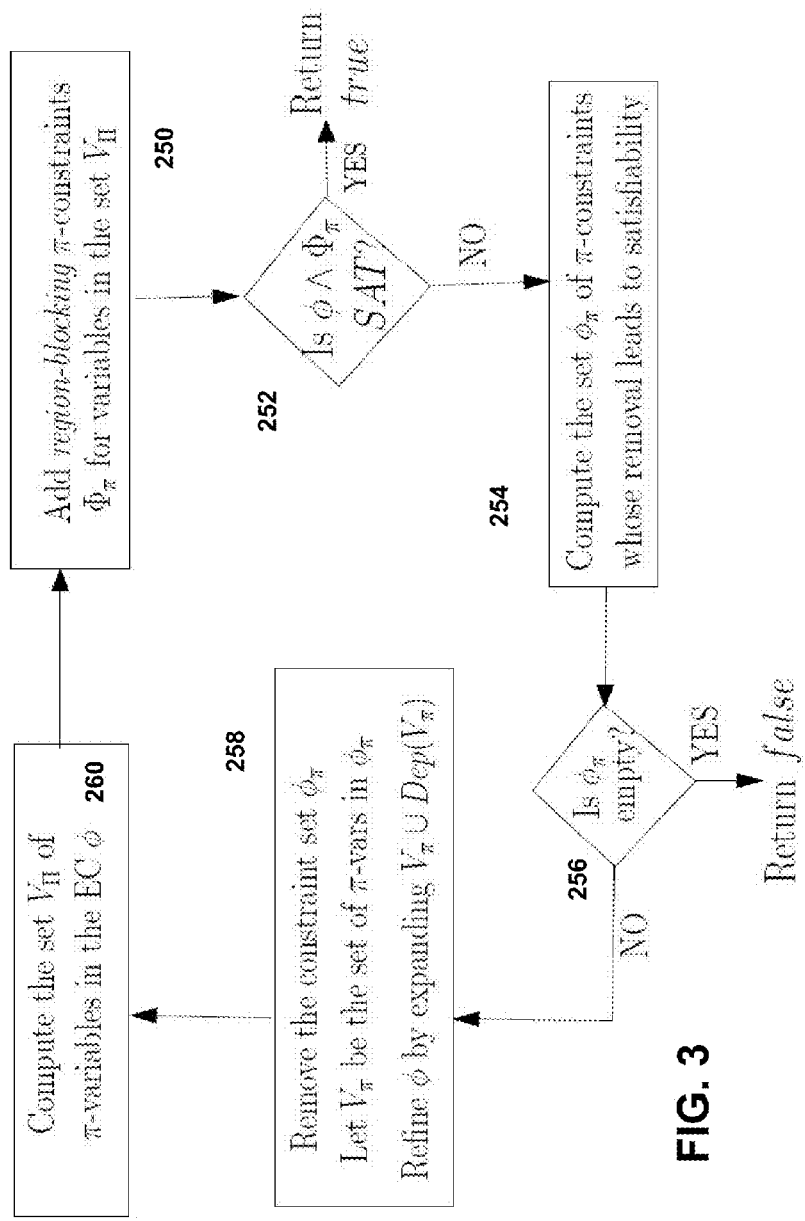
FIG. 3 shows an exemplary inertial refinement process.

FIG. 3 shows an exemplary IR process. IR proceeds by iteratively adding or removing $\pi$-constraints in 250, until the result is satisfiable (SAT) or unsatisfiable (UNSAT) in 252. In order to resist exploration of irrelevant regions, the procedure first asserts $\pi$-constraints ($\Phi_\pi$) for all $\pi$-variables in the current EC $\phi$. If $\phi$ remains satisfiable even after adding $\Phi_\pi$, the procedure returns true in 252, implying that a witness for $\phi$ exists that does not involve traversing the blocked regions. Otherwise (the constraints are UNSAT), a subset $\phi_\pi$ of $\pi$-constraints is computed, whose removal leads to a satisfiable solution in 254. The set $\phi_\pi$ corresponds to a set of blocked regions whose exploration may lead to the discovery of a concrete witness to $\phi$. If the set $\phi_\pi$ is empty in 256, then no witness for $\phi$ exists, and IR returns false. Otherwise, IR performs exploration of the regions corresponding to $\phi_\pi$ in 258. First, the paths to the blocked regions are exposed by removing all $\pi$-constraints in $\phi_\pi$. Then, IR refines $\phi$ by expanding the placeholders $V_\pi$ in $\phi_\pi$ and their dependent placeholders Dep($V_\pi$) with the corresponding summary expressions. The process then computes a set of $\pi$-variables in the current EC $\phi$ in 260.

IR process needs to determine $\phi_\pi \subseteq \Phi_\pi$ efficiently. A correction set (CS) of a set of constraints is determined: given an unsatisfiable set of constraints $\Psi$, a correction set $\psi$ is a subset of $\Psi$ such that removing $\psi$ makes $\Psi \backslash \psi$ satisfiable. To obtain efficient inertial refinement, i.e., explore a small set of blocked regions, a minimal correcting set (MCS) is determined, none of whose proper subsets are correction sets. The notion of correction sets is closely related to that of maximal satisfiable subsets (MSSs), which is a generalization of the solution of the Max-SAT problem. An MSS is a satisfiable subset of constraints that is maximal, i.e., adding any of one of the remaining constraints would make it UNSAT. The complement of an MSS consisting of the remaining set of unsatisfied constraints is an MCS. For example, the UNSAT constraint set ((x),($\neg$xvy),($\neg$y)) admits three MCSs, (x), ($\neg$xvy), and ($\neg$y), all of which are minimum. The system obtains constraints (MCS) that allow a witness to appear in the abstract model. The notion of MCSs is also related to computing an interesting witness to a satisfiable temporal logic formula by detecting vacuous literals. Computing MCSs makes IR expensive as compared to the light-weight DCR method, which only needs a model from the solver; however, exploring fewer regions in IR should compensate for the extra cost.

The IR procedure can be implemented efficiently using an incremental SMT solver. These solvers maintain an internal context of constraints to provide incremental checking; constraints can be asserted or retracted iteratively from the context while checking, and the solver is able to reuse the inferred results effectively from the previous checks. Moreover, many solvers, e.g., allow for asserting weighted constraints and solving Max-SAT (MSS) problems. MCSs can be derived by asserting π-constraints with non-zero weights and computing the subset of unsatisfied constraints in the weighted Max-SAT solution. Alternatively, MCSs can be obtained from a solver that produces UNSAT cores by computing the minimal hitting constraints for the set of UNSAT cores generated by the solver.

FIG. 4 shows a pseudo-code of the inertial refinement process Ref-IR using an SMT solver. Ref-IR replaces the naive Ref procedure in the overall SAR. The description uses the symbol ctx to denote the context of the incremental solver and the methods Assert and Retract are used for adding and removing constraints to the context incrementally. The procedure starts at the BEGIN block by asserting the current EC $\phi$ in the solver's context. Depending on whether the context is satisfiable or not, the control switches to the locations labeled by BLOCK and EXPAND respectively. In the BLOCK case, the region-blocking constraints $\Phi_\pi$ are asserted first. If the resultant context is satisfiable, Ref-IR returns with SAT result. Otherwise, the control switches to the UNSAT label. Here, a MCS $\phi_\pi$ of π-constraints is computed to check if removing any π-constraints may admit a witness to $\phi$. If the MCS is empty, no witness is possible and the procedure returns UNSAT. Otherwise, all the π-constraints in the MCS are retracted and the EC 0 is refined by expanding π-variables $V_\pi$ in $\phi_\pi$ together with their dependent variables $Dep(V_\pi)$. The inertial refinement procedure Ref-IR returns SAT while checking an EC $\phi$ only if there exists a concrete witness to the error node for $\phi$.

Referring back the summary of the procedure foo (Table 1) presented in Example 1. The EC $\phi$ for the assertion at line 12 is $(\psi_{foo} \wedge y_1 < 0)$, where $y_1 = ite(x_1 = c \wedge \pi_\pi, \lambda_{n,ret}, 0)$ and $x_1 = ite(p \neq 0 \wedge \pi_b, \lambda_{b,ret}, c)$; $\phi$ contains two π-variables $\pi_b$ and $\pi_n$, corresponding to bar and neg functions respectively. Initially, $\phi$ is satisfiable, and Ref-IR process switches to the BLOCK label. The Ref-IR process first blocks both π-variables (adds π-constraints) and then checks for a solution. No solution is found since foo contains no feasible paths that do not call a function. Therefore, the control switches to the EXPAND label. Here, Ref-IR computes an MCS of π-constraints $\phi_\pi$ (minimum in this case), which consists of ($\neg \pi_n$), implying that function neg must be explored to find a witness. The procedure then removes $\phi_\pi$ and refines $\phi$ by expanding $\pi_n$ and the dependent placeholder $\lambda_{n,ret}$. The corresponding summary constraints ($\pi_n$=true and $\lambda_{n,ret}$=ite($x_1>0,-x_1,x_1$) respectively) are generated by analyzing the neg function (cf. FIG. 1). On checking again after expansion, the solver finds a witness (lines 2-3-4-6-7-8-9-10-12, with say, c=1, p=0, $x_1=1$, $y_1=-1$) to $\phi$. Ref-IR now checks if the witness is an actual one (BLOCK label) by blocking all π-variables. Note that $\pi_b$ is the only π-variable remaining in $\phi$ and the corresponding π-constraint is already asserted. Therefore, Ref-IR concludes that the witness is an actual one and terminates. Ref-IR is guided both by the abstract EC $\phi$ as well as the modular program structure in avoiding the redundant expansion of the complex function bar. Also, the efficiency of Ref-IR crucially depends on the computed MCSs.

In another example using Inertial Refinement with Loop-specific Abstraction, in the function loopf in FIG. 1, a loop region iteratively updates i and j, bounded by the input variable n, and the assertion A at line 7 checks if j<2*n on loop exit. If n≧3, the assertion is violated. To check A, SAR computes an EC $\phi$ for A in loopf, by first skipping the loop region as usual with an abstraction (π,σ), where σ maps i and j to free placeholders. If π is found relevant to feasibility of $\phi$, IR refines (π,σ) to a loop-specific abstraction. More precisely, IR sets (1) $\pi = (\pi_0 \vee \pi_{1+})$, where placeholders $\pi_0 = \neg$ (0<n) and $\pi_{1+}$ represent path conditions after zero or ≧1 loop iterations, respectively, and (2) $\sigma = [j \mapsto ite(\pi_0, 0, \lambda_{j,1+}); i \mapsto ite(\pi_0, 0, \lambda_{i,1+})]$, where $\lambda_{j,1+}$ and $\lambda_{i,1+}$, respectively, are the values of j and i obtained after ≧1 loop iterations. This abstraction splits the loop regions into paths for zero ($\pi_0$) or ≧1 ($\pi_{1+}$) loop iterations. Similarly, j=0 for paths $\pi_0$ and j=$\lambda_{j,1+}$ otherwise. IR continues in the usual manner now, by blocking $\pi_{1+}$, detecting that $\phi$ is UNSAT, computing the MCS $\neg \pi_{1+}$, refining $\pi_{1+}, \lambda_{j,1+}$ with their summaries (while retaining the loop-specific abstraction), and so on. The expected concrete witness to $\phi$ is found after three iterations.

The present system handles loops directly with this loop-specific abstraction as opposed to static unrolling (which may fail to detect this witness) or transforming loops to tail-recursive functions. Methods based on refining predicate abstractions may detect this violation precisely; however, constructing and refining predicate abstractions is much more expensive. Refining loops may be expensive for large number of iterations; however, we observed that many real-life reactive programs admit an error witness with small number (2 or 3) of loop unrollings.

Next, experimental evaluations of the system described above are discussed. In one implementation, the SAR method with inertial refinement is implemented in the F-Soft verification framework for C programs. Experimental results on real-life benchmarks show that the method explores fewer regions than a state-of-the-art refinement technique while maintaining competitive run-times. The framework constructs an eager memory model for C programs by bounding the heap, flattening aggregate data types into simple types, and modeling the effect of pointer dereferences by an explicit case analysis over the points-to sets for the pointer variables. Also, F-Soft instruments the program for properties being checked, e.g., dereference safety (N), array bounds violation (A) and string related checks (S). Therefore, SAR is able to check multiple types of properties in an uniform manner in the F-Soft framework. The initial model is simplified by the tool with constant folding, program slicing and other lightweight static analysis, and is then provided as an input to the SAR procedure.

The implementation of SAR computes summaries and ECs for all program regions locally, stores them efficiently by representing terms as directed acyclic graphs (DAGs) and manipulates them using memorized traversal algorithms. The local ECs were hoisted up to the entry function and checked using the YICES SMT solver in an incremental manner with refinement. To precisely model non-linear operators, e.g., modulo, which occur in many of the benchmarks, we encode all variables with bit-vectors. Experimental comparison with state-of-the-art refinement methods shows that IR explores fewer program regions to detect bugs, while maintaining competitive run-times.

In sum, the modular software bug detection method uses structural abstraction/refinement, based on analyzing program regions corresponding to modular program constructs. The inertial refinement procedure IR enables structural refinement to work effectively: IR resists the exploration of abstracted program regions by trying to find a witness for an assertion inside the program regions explored previously. The procedure IR implemented in the F-Soft framework scales to large benchmarks and is able to check properties by exploring fewer program regions than the previous don't-care based refinement technique. IR can be combined with other schemes such as DCR for more effective placeholder selection. Further, the present system can dynamically expand the heap during analysis. The system can also partition a program automatically for efficient SAR.

What is claimed is:

1. A method to detect an error in software with a computer readable code, comprising:
   applying a modular analysis based on a structural abstraction and refinement of a program structure;
   detecting an assertion violation indicative of a software bug;
   performing inertial refinement of one or more program regions to avoid exploring a new region until necessary; and
   employing one or more minimal correcting sets produced by a constraint solver to select one or more program regions to explore.

2. The method of claim 1, comprising eapanding arbitray program regions during refinement Based on a hierarchical programm structure.

3. The method of claim 1, comprising expanding a relevant placeholder and reducing the number of expanded placeholders.

4. The method of claim 1, comprising employing blocking and unblocking paths to program regions using a path summary variable for a predetermined region.

5. The method of claim 1, comprising expanding one or more loops dynamically during analysis.

6. The method of claim 1, comprising expanding one or more recursive functions dynamically during analysis.

7. The method of claim 1, comprising determining a local function summary using a side-effect analysis of a called function.

8. The method of claim 1, wherein the modular analysis comprises an under-approximate data flow analysis, comprising:
   a. approximating function summaries using structural abstraction;
   b. checking error conditions using structural refinement; and
   c. performing forward composition of summaries using a work list.

9. A system to detect errors in software, comprising:
   a processor to execute the software;
   computer readable code executable by the processor for applying a modular analysis of the software based on a structural abstraction and refinement of a program structure;
   computer readable code executable by the processor for detecting an assertion violation indicative of a software bug;
   computer readable code executable by the processor for performing inertial refinement of one or more program regions to avoid exploring a new region until necessary; and
   computer readable code executable by the processor for employing one or more minimal correcting sets produced by a constraint solver to select one or more program regions to explore.

10. The system of claim 9, comprising computer readable code executable by the processor for expanding arbitrary program regions during refinement based on a hierarchical program structure.

11. The system of claim 9, comprising computer readable code executable by the processor for expanding a relevant placeholder and reducing the number of expanded placeholders.

12. The system of claim 9, comprising computer readable code executable by the processor for employing blocking and unblocking paths to program regions using a path summary variable for a predetermined region.

13. The system of claim 9, comprising computer readable code executable by the processor for expanding one or more loops dynamically during analysis.

14. The system of claim 9, comprising computer readable code executable by the processor for expanding one or more recursive functions dynamically during analysis.

15. The system of claim 9, comprising computer readable code executable by the processor for determining a local function summary using a side-effect analysis of a called function.

16. The system of claim 9, wherein the modular analysis comprises an under-approximate data flow analysis, comprising:
   a. computer readable code executable by the processor for approximating function summaries using structural abstraction;
   b. computer readable code executable by the processor for checking error conditions using structural refinement; and
   c. computer readable code executable by the processor for performing forward composition of summaries using a work list.

* * * * *